United States Patent
Hohmuth et al.

(10) Patent No.: US 8,621,183 B2
(45) Date of Patent: Dec. 31, 2013

(54) PROCESSOR WITH SUPPORT FOR NESTED SPECULATIVE SECTIONS WITH DIFFERENT TRANSACTIONAL MODES

(75) Inventors: Michael P. Hohmuth, Dresden (DE); David S. Christie, Austin, TX (US); Stephan Diestelhorst, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1160 days.

(21) Appl. No.: 12/510,856

(22) Filed: Jul. 28, 2009

(65) Prior Publication Data

US 2010/0023707 A1    Jan. 28, 2010

Related U.S. Application Data

(60) Provisional application No. 61/084,008, filed on Jul. 28, 2008.

(51) Int. Cl.
*G06F 9/30* (2006.01)
(52) U.S. Cl.
USPC .......................................................... 712/218
(58) Field of Classification Search
None
See application file for complete search history.

(56) References Cited

U.S. PATENT DOCUMENTS

| | | |
|---|---|---|
| 7,206,903 B1 | 4/2007 | Moir et al. |
| 7,328,316 B2 | 2/2008 | Moir et al. |
| 2007/0239942 A1 | 10/2007 | Rajwar et al. |
| 2008/0005504 A1 | 1/2008 | Barnes et al. |
| 2009/0031310 A1* | 1/2009 | Lev et al. ............... 718/101 |

OTHER PUBLICATIONS

Rajwar, et al., "Transactional Lock-Free Execution of Lock-Based Programs," In Proceedings of the Tenth International Conference on Architectural Support for Programming Languages and Operating Systems, Oct. 2002, pp. 5-17.
Diestelhorst, et al., "Hardware Acceleration for Lock-Free Data Structures and Software-Transactional Memory," Aug. 14, 2008, 8 pages.
Damron, et al., "Hybrid Transactional Memory," In Proceedings of the 12th International Conference on Architectural support for programming languages and operating systems (ASPLOS-XII), pp. 336-346, New York, NY, USA, 2006, ACM.
Herlihy, et al., "Transactional Memory: Architectural Support for Lock-Free Data Structures," In Proceedings of the 20th Annual International Symposium on Computer Architecture, pp. 289-300, May 1993.
Rajwar, et al., "Speculative Lock Elision: Enabling Highly Concurrent Multithreaded Execution," In Proceedings of the 34th International Symposium on Microarchitecture (MICRO), Dec. 3-Dec. 5, 2001, Austin, Texas, 12 pages.

(Continued)

*Primary Examiner* — Andrew Caldwell
*Assistant Examiner* — Benjamin Geib

(57) ABSTRACT

A system and method are disclosed wherein a processor of a plurality of processors coupled to shared memory, is configured to initiate execution of a section of code according to a first transactional mode of the processor. The processor is configured to execute a plurality of protected memory access operations to the shared memory within the section of code as a single atomic transaction with respect to the plurality of processors. The processor is further configured to initiate, within the section of code, execution of a subsection of the section of code according to a second transactional mode of the processor, wherein the first and second transactional modes are each associated with respective recovery actions that the processor is configured to perform in response to detecting an abort condition.

17 Claims, 12 Drawing Sheets

(56) References Cited

OTHER PUBLICATIONS

Dice, et al., "Early Experience with a Commercial Hardware Transactional Memory Implementation," In Proceedings of the 14th International Conference on Architectural support for Programming Languages and Operating Systems, pp. 157-168, New York, NY, USA, 2009, ACM.

Bobba, et al., "Performance Pathologies in Hardware Transactional Memory," ACM SIGARCH Computer Architecture News, pp. 81-91, New York, NY, USA, 2007 ACM.

Ananian, et al., "Unbounded Transactional Memory," In Proceedings of the Eleventh IEEE Symposium on High-Performance Computer Architecture, pp. 316-327, Feb. 2005.

Chafi, et al. ,"A Scalable, Non-blocking Approach to Transactional Memory." In Proceedings of the Thirteenth IEEE Symposium on High-Performance Computer Architecture, pp. 97-108, Feb. 2007.

Chuang et al., "Unbounded Page-Based Transactional Memory," In Proceedings of the Twelfth International Conference on Architectural Support for Programming Languages and Operating Systems, Oct. 2006.

Chung et al, "Tradeoffs in Transactional Memory Virtualization," In Proceedings of the Twelfth International Conference on Architectural Support for Programming Languages and Operating Systems, Oct. 2006.

McDonald, et al., "Architectural Semantics for Practical Transactional Memory," In Proceedings of the 33nd Annual International Symposium on Computer Architecture, Jun. 2006.

Moravan, et al., "Supporting Nested Transactional Memory in LogTM," In Proceedings of the Twelfth International Conference on Architectural Support for Programming Languages and Operating Systems, pp. 359-370, Oct. 2006.

Yen, et al., "LogTM-SE: Decoupling Hardware Transactional Memory from Caches," In Proceedings of the Thirteenth IEEE Symposium on High-Performance Computer Architecture, pp. 261-272, Feb. 2007.

International Search Report for Application No. PCT/US2009/004349, mailed Oct. 9, 2009, 7 pages.

Written Opinion for International Application No. PCT/US2009/004349, mailed Oct. 9, 2009, 7 pages.

Mendel Rosenblum and Tal Garfinkel, "Virtual Machine Monitors: Current Technology and Future Trends," May 2005, 10 pages, vol. 38, Computer IEEE Service Center.

Ravi Rajwar, Maurice Herlihy, Konrad Lai, "Virutalizing Transactional Memory, " Jun. 2005, 12 pages, Proceedings of the 32nd International Symposium on Computer Architecture.

\* cited by examiner

| CPU A mode | CPU A operation | CPU B cache-line state | |
|---|---|---|---|
| | | Protected Shared | Protected owned* |
| Any | Read operation | OK | B aborts |
| Any | Write operation | B aborts | B aborts |
| Any | Prefetch operation | OK | B aborts |
| Any | PREFETCHW | B aborts | B aborts |
| Critical section | LOCK MOVx (load) | OK | B aborts |
| Critical section | LOCK PREFETCH | OK | B aborts |
| Critical section | LOCK PREFETCHW | B aborts | B aborts |

"owned*" --Modified or owned

FIG. 7

PROCESSOR WITH SUPPORT FOR NESTED SPECULATIVE SECTIONS WITH DIFFERENT TRANSACTIONAL MODES

This application claims benefit of priority to U.S. Provisional Patent Application No. 61/084,008, filed Jul. 28, 2008. The preceding provisional application is incorporated herein by reference in its entirety. To the extent that material in the Provisional Application conflicts with material expressly set forth herein, the material expressly set forth herein controls.

BACKGROUND

Shared-memory computer systems allow multiple concurrent threads of execution to access shared memory locations. Unfortunately, writing correct multi-threaded programs is difficult due to the complexities of coordinating concurrent memory access.

Traditionally, to ensure program correctness, programmers have used locks or other mutual exclusion mechanisms for coordinating access to shared memory locations. For example, using traditional locks, a thread may be configured to acquire and hold a lock on each memory location to which it needs exclusive access. While the thread holds the lock, no other thread may acquire the lock, and therefore, no other thread may access the memory location protected by that lock. However, traditional locking techniques are vulnerable to various pitfalls, including dead-lock, race conditions, priority inversions, software complexity, and performance limitations.

An alternative approach to concurrency control is transactional memory. In a transactional memory programming model, a programmer may designate a section of code (i.e., an execution path or a set of program instructions) as a "transaction" which should be executed atomically with respect to other threads of execution. For example, if the transaction includes two memory store operations, then the transactional memory system ensures that all other threads may only observe either the cumulative effects of both memory operations or of neither, but not the effects of only one. In addition to a simplified programming model, transactional memory systems can also increase application performance since they may allow finer grained memory sharing than do traditional locks.

Various transactional memory systems have been proposed in the past, including those implemented in software, in hardware, or in a combination thereof. However, many previous concepts and implementations are bound by various limitations. For example, software-based transactional memory systems (STMs) suffer an undesirable performance overhead while hardware proposals (HTMs) may be prohibitively complex to implement.

SUMMARY

A system and method are disclosed wherein a processor of a plurality of processors coupled to shared memory, may be configured to initiate execution of a section of code according to a first transactional mode of the processor. The processor may be further configured to execute a plurality of protected memory access operations to the shared memory within the section of code as a single atomic transaction with respect to the plurality of processors. The processor may be further configured to initiate, within the section of code, execution of a subsection of the section of code according to a second transactional mode of the processor. According to some embodiments, the first and second transactional modes may each be associated with respective recovery actions that the processor is configured to perform in response to detecting an abort condition.

In some embodiments, the first transactional mode may be a rollback mode. In such embodiments, if the processor detects an abort condition while executing the section of code in rollback mode, the processor may be configured to discard any modifications to the shared memory made by one or more of the protected memory access operations and to roll back execution to the start of the section of code. For example, rolling back execution to the start of the section of code may include modifying values held in one or more registers (e.g., stack pointer, instruction pointer, etc.) to return program control flow to the start of the section of code.

In some embodiments, the second transactional mode may be a store-conditional mode. In such embodiments, if the processor detects an abort condition while executing the subsection in store-conditional mode, the processor may be configured to discard any modifications to the shared memory made by one or more of the protected memory access operations, but rather than rolling back execution to the start of the section of code, the processor may continue execution of the subsection of code but without executing subsequent store operations to shared memory.

BRIEF DESCRIPTION OF THE DRAWINGS

FIG. 7 is a table summarizing a set of rules defining how various ASF implementations may handle data contention, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Transactional memory systems may allow software threads in multi-threaded systems to access (read and/or write) a set of shared memory locations atomically with respect to other threads, without requiring the overhead and programming complexity associated with traditional synchronization mechanisms such as mutual-exclusion using locks. However, further techniques are necessary for increasing the efficiency of transactional memory systems.

According to some embodiments, various hardware mechanisms may be used to implement efficient transactional memory mechanisms, as described herein. In some embodiments, computationally inexpensive primitives (e.g., program instructions) may be defined for instructing the hardware to perform various synchronization functions, which may be used to synthesize higher-level synchronization mechanisms. The hardware mechanisms and/or program instructions may collectively be referred to herein as the Advanced Synchronization Facility (ASF).

In some embodiments, an existing processor architecture (e.g., x86) may be augmented to implement ASF mechanisms. For clarity of explication, the remainder of this disclosure describes how the known 64-bit x86 architecture AMD64 may be augmented with ASF mechanisms to implement transactional memory. However, these example embodiments are not intended to limit ASF mechanisms to this architecture alone and given the benefit of this disclosure, implementations of ASF mechanisms in other processor architectures will become evident to those skilled in the art.

Figure 1:
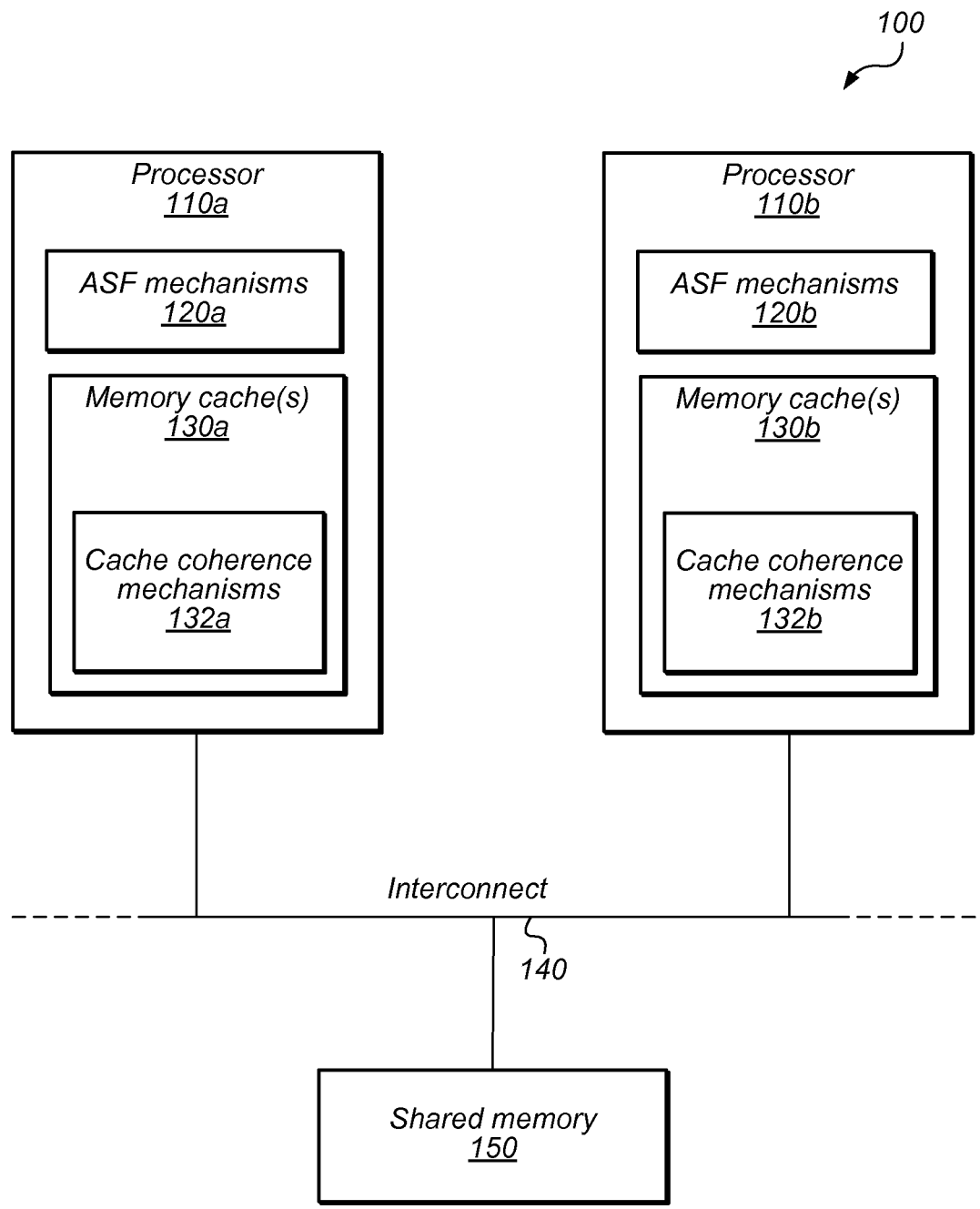
FIG. 1 is a block diagram illustrating components of a multi-processor computer system configured to implement ASF, according to various embodiments.

FIG. 1 is a block diagram illustrating components of a multi-processor computer system configured to implement ASF, according to various embodiments. According to the illustrated embodiment, computer system 100 may include multiple processors, such as processors 110*a* and 110*b*. In some embodiments, processors 110 may comprise multiple physical or logical (e.g., SMT) cores and be coupled to each other and/or to a shared memory 150 over an interconnect, such as 140. In various embodiments, different interconnects may be used, such as a shared system bus or a point-to-point network in various topographies (e.g., fully connected, torus, etc.).

According to the illustrated embodiment, each processor 110 may include one or more levels of memory caches 130. Levels of memory caches may be hierarchically arranged (e.g., L1 cache, L2 cache, L3 cache, etc.) and may be used to cache local copies of values stored in shared memory 150.

In various embodiments, memory caches 130 may include various cache-coherence mechanisms 132. Cache-coherence mechanisms 132 may, in one embodiment, implement a cache coherence communication protocol among the interconnected processors to ensure that the values contained in memory caches 130 of each processor 110 are coherent with values stored in shared memory and/or in the memory caches of other processors. Several such protocols exist (including the MESI (i.e., Illinois protocol) and MOESI protocols), and may be implemented in various embodiments. Cache coherence protocols may define a set of messages and rules by which processors may inform one another of modifications to shared data and thereby maintain cache coherence. For example, according to the MESI protocol, each block stored in a cache must be marked as being in one of four states: modified, exclusive, shared, or invalid. A given protocol defines a set of messages and rules for sending and interpreting those messages, by which processors maintain the proper markings on each block. Depending on the state of a given cache block, a processor may be restricted from performing certain operations. For example, a processor may not execute program instructions that depend on a cache block that is marked as invalid. Cache coherence mechanisms may be implemented in hardware, software, or in a combination thereof, in different embodiments. Cache coherence messages may be may be communicated across interconnect 140 and may be broadcast or point-to-point.

According to the illustrated embodiment, each processor 110 may also include various ASF mechanisms for implementing transactional memory, as described herein. In various embodiments, more processors 110 may be connected to interconnect 140, and various levels of cache memories may be shared among multiple such processors and/or among multiple cores on each processor.

Figure 2:
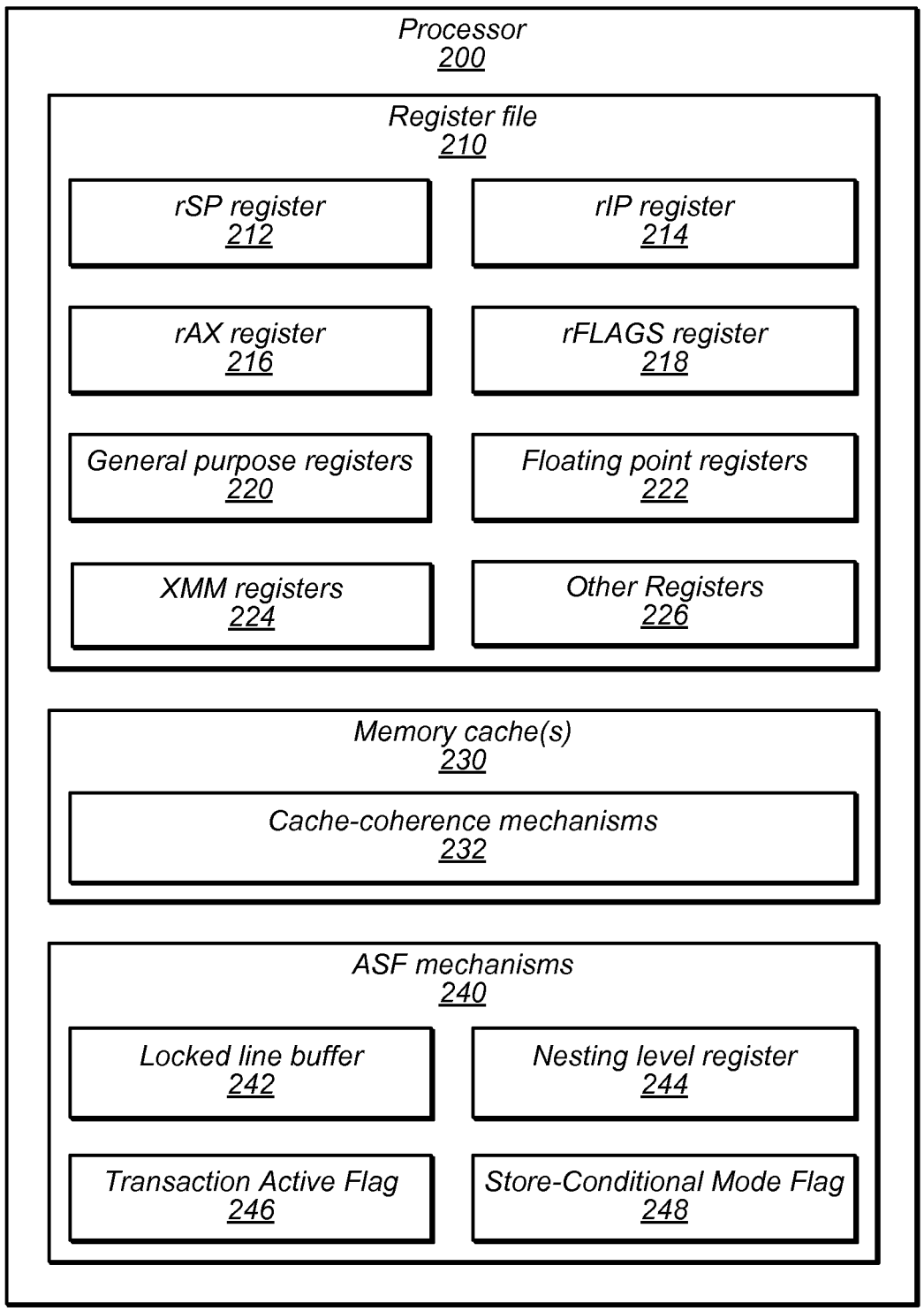
FIG. 2 is a block diagram illustrating a more detailed view of components comprising a processor, according to one embodiment.

FIG. 2 is a block diagram illustrating a more detailed view of components comprising a processor, such as processors 110, according to one embodiment. According to the illustrated embodiment of FIG. 2, processor 200 comprises register file 210, which may include various registers, each of which may be of any size (e.g., 16-bit, 32-bit, 64-bit, 128-bit, etc.) For example, register file 210 may include various known x86 registers, such as rSP register 212 (stack pointer), rIP register 214 (instruction pointer), rAX register 216 (accumulator register), and/or rFLAGS register 218 (flags register indicating processor state). In some embodiments, register file 210 may further comprise any number of general purpose registers 220 and/or floating point registers 222. In some embodiments, register file 210 may include one or more 128-bit registers, such as XMM registers 224. In various embodiments, register file 210 may comprise any number of other registers 226, which may be of various sizes.

According to the illustrated embodiment, processor 200 may include memory caches 230 for storing local copies of values in shared memory and cache-coherence mechanisms 232 for maintaining the consistency of those values across various copies dispersed within shared memory, the cache, and other caches. Processor 200 may also include ASF mechanisms 240 for implementing transactional synchronization mechanisms, as described herein. ASF mechanisms 240 may include the data structures and/or logic to implement memory transactions as described herein, according to various embodiments. In some embodiments, ASF mechanisms 240 may include a locked line buffer 242, which may be used in case of an abort to roll back memory changes made by a partially executed transaction, as described below. In some embodiments, ASF mechanisms 240 may include a nesting level register 244, which may hold a value indicating the depth to which the current transaction is nested in other transactions, as described below in more detail. In some embodiments ASF mechanisms may include a flag to indicate whether a transaction is active, such as transaction active flag 246. In some embodiments, ASF mechanisms may include a flag indicating a transactional mode, such as store-conditional mode flag 248, which may be set to indicate whether an executing transaction is executing in store-conditional mode or in another mode. In further embodiments, other flags and/or registers may be implemented in ASF mechanisms 240 in support of transactional execution.

Figure 3:
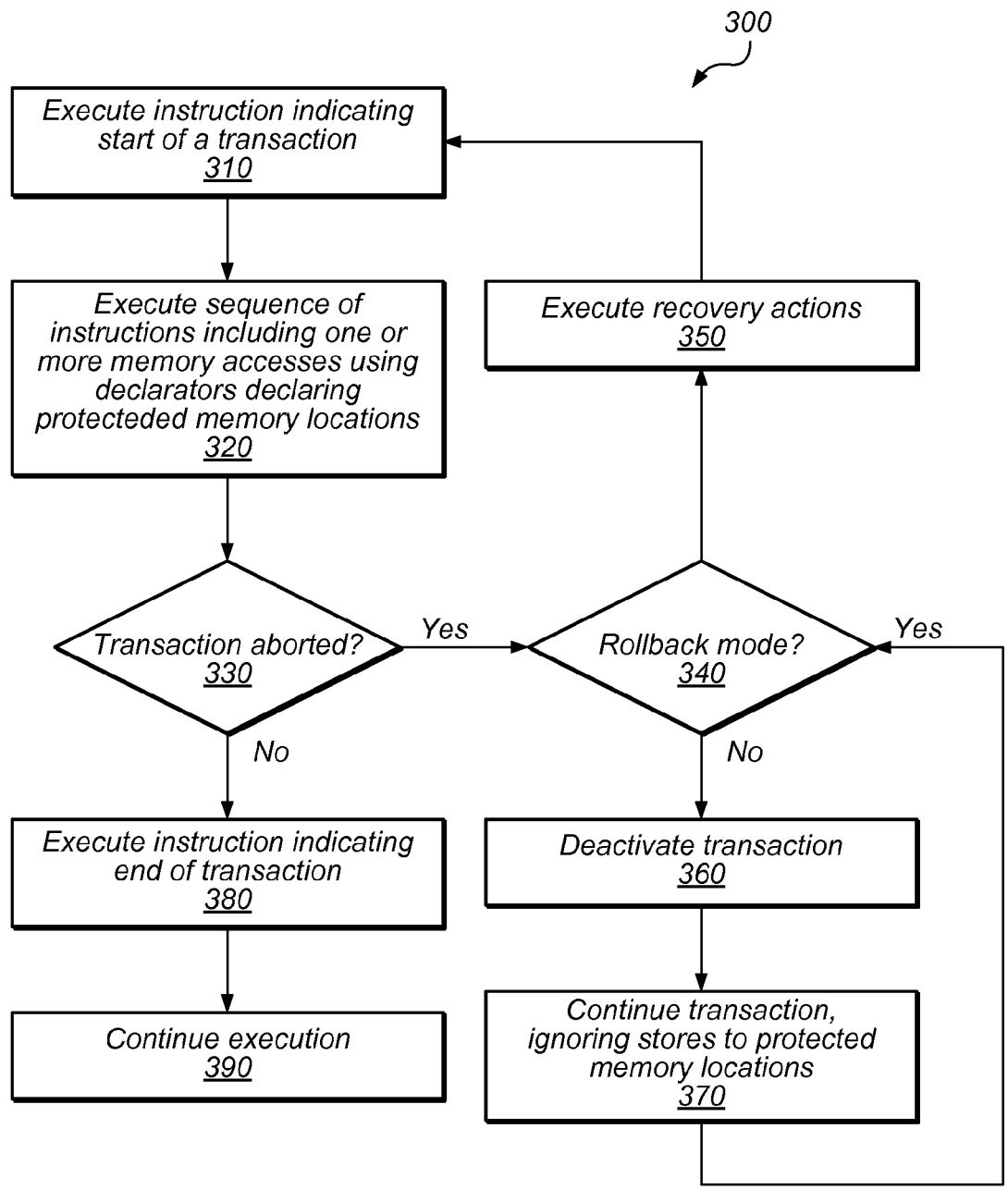
FIG. 3 is a general flow diagram illustrating a method for executing a transaction using ASF, according to various embodiments.

FIG. 3 is a general flow diagram illustrating a method for executing a transaction using ASF, according to various embodiments. According to the illustrated embodiment, ASF may allow software (e.g., a thread) to begin a transaction (i.e., a critical section of code) by executing a given instruction (or multiple instructions) indicating the start of a transaction, as in 310. As discussed later, in various embodiments, ASF instructions such as SPECULATE or BEGIN may be used to indicate the start of a critical section.

After beginning a transaction, the thread may execute a series of instructions comprising the transaction body, as in 320. Such instructions may include a number of memory access (read and/or write) operations, some number of which may designate that the accessed memory location should be protected. A thread may designate that a given memory location should be protected by using one or more special declarator instructions provided by ASF. ASF mechanisms may ensure that access to protected memory (as designated by declarator instructions) occur atomically with respect to all other concurrently executing threads in the system (i.e., all at once or not at all). For example, if the transaction includes multiple protected writes to memory, then ASF mechanisms may ensure that no other thread may observe the result of only a subset of those protected writes to memory. In another example, according to some embodiments, if the transaction includes one or more protected memory read operations, then ASF mechanisms may ensure that the transaction completes successfully only if no other thread has modified the protected read locations before the transaction has completed. In various embodiments, a "memory location" protected by a declarator operation may be of different sizes, such as that of a system dependent cache block or of another size.

According to such embodiments, ASF may be configured to protect only memory lines that have been specified using designated declarator instructions. In such embodiments, all other memory locations may remain unprotected and may be modified inside a critical section using standard x86 instructions. These modifications to unprotected memory may become visible to other CPUs immediately upon execution, for example, in program order. In some embodiments, a transaction body (e.g., instructions executed in 320) may comprise one or more other transactions (i.e., nested transactions).

According to various embodiments, if one or more conditions of the transactional execution have been violated, then the transaction may abort (as indicated by the affirmative exit from 330). In various embodiments, transactional attempts may be aborted at any point because of contention with other processors, far control transfers (such as those caused by interrupt and faults), execution of explicit software ABORT instructions, insufficient hardware resources, other implementation-specific conditions, etc.

In various embodiments, when a transactional attempt aborts, different recovery actions may be taken depending on the mode of transactional execution. In various embodiments, for each transaction, ASF may support a rollback mode of execution and/or a store-conditional mode of execution. In some embodiments, the mode of execution may determine what actions are performed in response to a transactional attempt being aborted. For example, in some embodiments, aborting a transaction in rollback mode may cause execution to be "rolled back" to the start of the transaction while aborting a transactional attempt in store-conditional mode may cause the transaction to continue but with transactional store operations not being performed (i.e., execution of transactional stores may be conditional on the transaction not having been aborted).

According to the illustrated embodiment, when a transaction executing in rollback mode aborts (as indicated by the affirmative exit from 340), ASF mechanisms may be configured to execute recovery actions, as in 350, which may include discarding modifications to the contents of the protected lines. By discarding such modifications, as in 350, ASF mechanisms may cause the modifications to be unobservable to other threads in the system, thereby complying by the atomicity property of the transaction. However, ASF mechanisms may be configured to not roll back modifications to unprotected memory, such as those performed using conventional x86 memory instructions. In some embodiments, the application programmer may provide software for accommodating these unprotected modifications, such as software recovery routines configured to reenter an initialization sequence leading up to the critical section.

In various embodiments, the recovery actions of 350 may be configured to roll back only a subset of the system registers (e.g., rIP and rSP) rather than all registers. In such embodiments, software may therefore be written to not rely on the content of various registers when entering transactional execution (e.g., by ignoring the initial contents of some registers after an abort event and/or to not modifying various registers during transactional execution).

In some instances, before an interrupt or exception handler returns, operating system code or other processes may have executed in the interim. Furthermore, in some instances, other processes may have even executed ASF transactions that inspected and/or modified locations targeted by the interrupted transaction. In some embodiments, ASF mechanisms may obviate these concerns by not maintaining any ASF-related state across context switches. Instead, in such embodiments, when the interrupted thread returns to the processor, ASF mechanisms may be configured to automatically abort and reattempt the transaction.

According to the illustrated embodiment, after executing some recovery action or actions, the thread may then reattempt the transaction, as indicated by the feedback loop from 350 to 310.

In some embodiments, an abort of a transaction executing in store-conditional mode (as indicated by the negative exit from 340) may be handled differently from an abort of a transaction executing in rollback (as indicated by the affirmative exit from 340). For example, while an abort of a rollback mode transaction may automatically reset execution flow to the beginning of the critical section (or to other recovery code), an abort of a transaction in store-conditional mode may be handled by undoing or otherwise discarding changes made by the critical section to values in protected memory locations and then and "deactivating" the transaction, as in 360. In various embodiments, deactivating the transaction may include setting a status code indicating that an abort has occurred and/or that the transaction is no longer active. In store-conditional mode, after the transaction is deactivated (as in 360), the system may continue to execute the critical section without executing any store operations to protected memory locations (as in 370). For example, after the transaction is deactivated, subsequent store operations to protected memory locations may be treated as no-ops.

In some embodiments, when the aborted transaction completes, a status code may be set in a register, such as rAX register 216 to indicate that the transaction was aborted. In some embodiments, the thread may be configured to detect that an abort status code has been set and perform one or more recovery actions, as indicated by the feedback loop from 370 to 350. In various embodiments, the recovery actions of 350 may be different for transactions that were aborted in store-conditional mode (i.e., from 370) than for those that were aborted in rollback mode (i.e., from 340). A more detailed discussion of transactions in rollback and store-conditional modes is provided below.

According to the illustrated embodiment, once the transaction body has been completed, the thread may execute one or more instructions indicating the end of the transaction to the ASF mechanisms, as in 380, such as a COMMIT instruction as discussed below. After committing the transaction, as in 380, the thread may continue execution, as in 390.

In some embodiments, ASF may support nesting of one or more transactions within one or more other transactions. For example, after a transaction is started as in 310 (e.g., by executing a SPECULATE command), the instructions of the transaction body being executed in 320 may begin another transaction (e.g., by executing another SPECULATE command) before the first transaction completed. In this case, the second ("child") transaction may be said to be "nested" within the first ("parent") transaction. A transaction that is not nested within any other transaction may be referred to herein as a "top-level" transaction.

Figure 4:
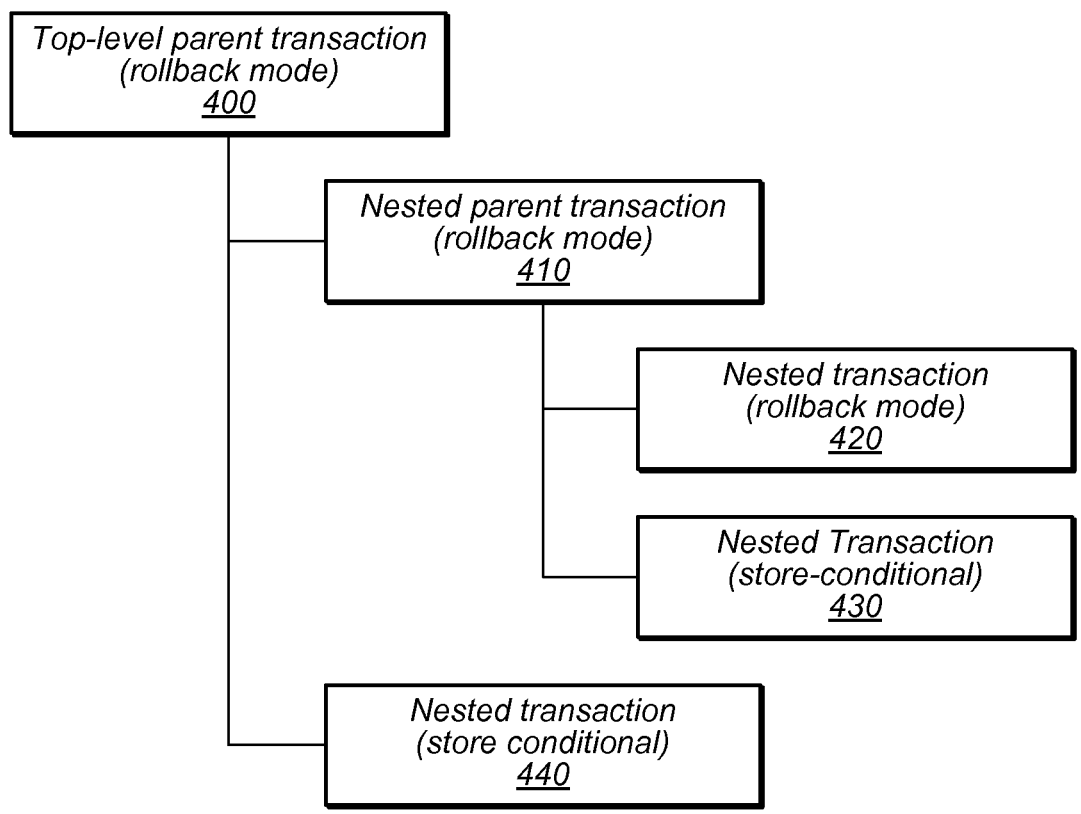
FIG. 4 is a block diagram illustrating an example of a nested transaction, according to one embodiment.

FIG. 4 illustrates an example of a nested transaction, according to one embodiment. According to FIG. 4, top-level parent transaction 400 is a rollback mode transaction that comprises two nested transactions: nested parent transaction 410, which is also in rollback mode and nested transaction 440, which is store-conditional mode. According to the illustrated embodiment, nested parent transaction 400 contains two nested transactions, including nested transaction 420 and nested transaction 430, which are in rollback and store-conditional modes respectively.

In some embodiments, ASF mechanisms may be configured to flatten nested transactions (e.g., composed of multiple SPECULATE-COMMIT pairs) into a single transaction. In some embodiments, nested transactions may share ASF hardware resources. That is, in some embodiments, during execution of a nested transaction, the memory locations protected by the parent transaction remain protected in the child transaction. Furthermore, in some embodiments, memory locations protected in a nested transaction may remain protected in the parent transaction, even after the nested transaction has completed. Thus, in some embodiments, parent transactions may need to continue to use protected memory operations when dealing with memory locations protected by a child transaction. In such embodiments, use of a regular memory write operation by the parent on a memory location protected by a child transaction may result in a general protection fault being raised (i.e., #GP exception).

In some embodiments, one or more store-conditional transactions may be nested within one or more rollback transactions. In some embodiments, due to the flattening of the nested transactions, ASF mechanisms may be configured to respond to an abort of a nested store-conditional transaction by performing the recovery actions of the top-level parent transaction (as in 350). However, according to some embodiments, a nested transaction may not be permitted inside of a store-conditional transaction.

To enable transactional execution, ASF mechanisms may define and expose various coherency control instructions that can be invoked by software threads. While some instructions may be named differently in different embodiments, various embodiments may expose coherency control instructions matching or analogous to one or more of the following.

Figure 5:
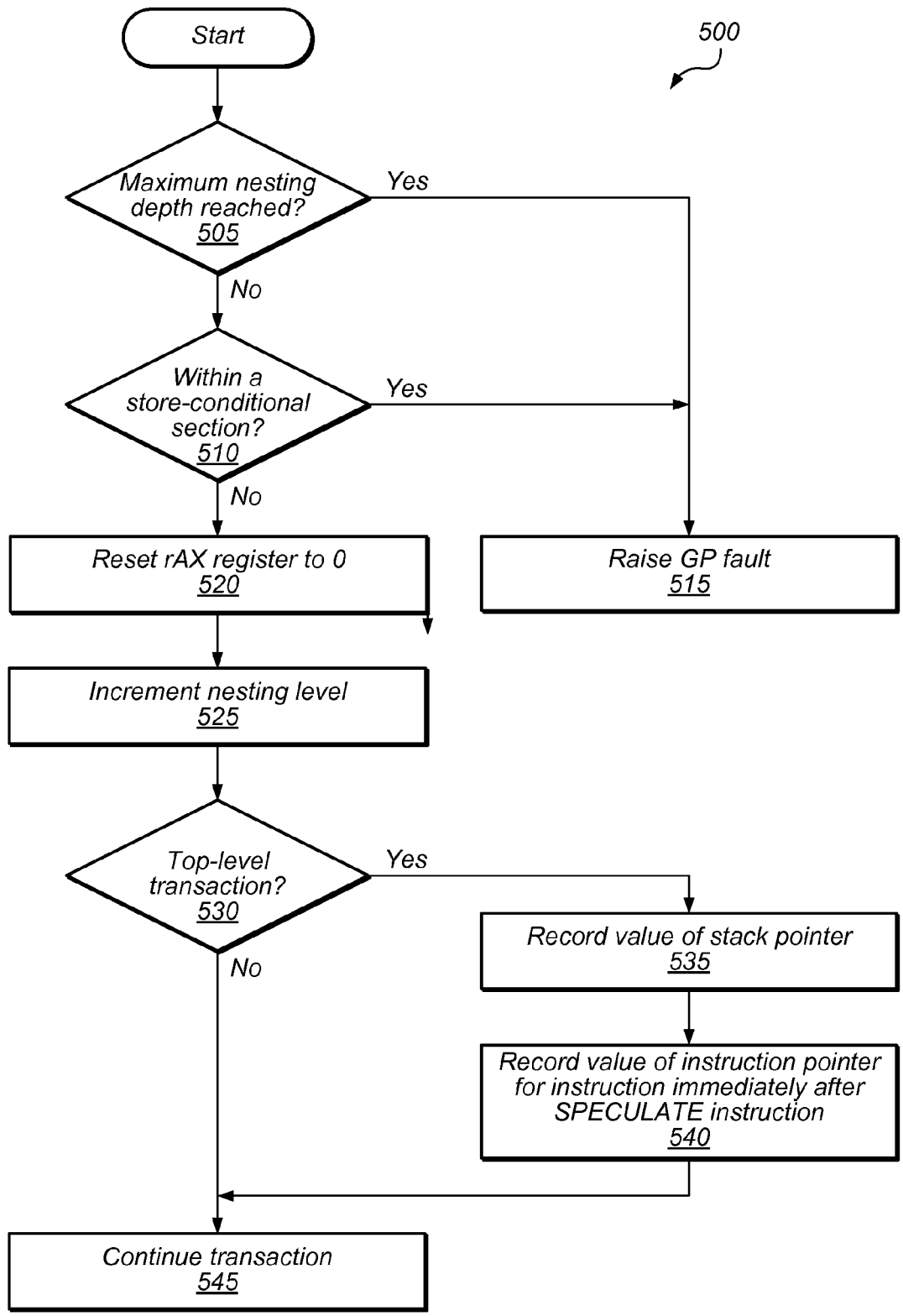
FIG. 5 is a flow diagram illustrating an implementation of a SPECULATE instruction to begin a speculative section in rollback mode, according to some embodiments.

FIG. 5 illustrates an implementation of a SPECULATE instruction, according to some embodiments. As discussed above, in some embodiments, the SPECULATE instruction may be executed by a thread to indicate the start of a transaction in rollback mode. According to the illustrated embodiment, executing the SPECULATE operation may comprise checking whether the transaction is nested beyond a maximum nesting depth supported by the system, as in 505. In various embodiments, different registers and/or memory locations may be used to hold the depth of the currently executing transaction. If the transaction is deeper than the system-defined maximum nesting depth, as indicated by the affirmative exit from 505, then ASF mechanisms may be configured to raise a general protection fault (#GP[0]), as in 515.

According to the illustrated embodiment, executing the SPECULATE instruction may further comprise determining whether the transaction is nested within a store-conditional transaction, as in 510. In some embodiments wherein transactions cannot be nested within store-conditional transactions, in response to detecting that the parent transaction is a store-conditional transaction, as indicated by the affirmative exit from 510, then the ASF mechanisms may be configured to raise a general protection fault (or take some other action), as in 515. In various embodiments, a register or memory location used to indicate the current mode of execution may be read to determine whether a parent transaction is executing in store-conditional mode. In further embodiments, various other checks for the transaction's validity may be performed and a GP fault may be raised if one or more are violated.

According to the illustrated embodiment, if the transaction is valid (e.g., does not exceed a maximum nesting depth and is not nested within a store-conditional transaction), then the rAX register (or other suitable register) may be reset, such as by setting it to a zero value. In some embodiments, the rAX register may hold various values and codes indicative of transactional execution status, as is described below.

According to the illustrated embodiment, the execution of SPECULATE may then determine whether the transaction is a top level transaction, as in 530. In some embodiments, this determination may comprise checking the value of the incremented nesting level to determine whether the current transaction is nested. If the transaction is a top-level transaction, as indicated by the affirmative exit from 530, then executing SPECULATE may comprise recording a checkpoint including information usable by the processor to return execution to a given rollback point if the transaction is aborted. In some embodiments, recording the checkpoint may include recording the values that the instruction pointer (e.g., rIP 214) and stack pointer (e.g., rSP 212) will have immediately after the SPECULATE instruction has been executed, as in 535 and 540. Thus, in case of an abort, the recorded checkpoint may be used to transfer control to the instruction immediately following the SPECULATE instruction. In some embodiments, executing SPECULATE may further comprise setting or modifying values in one or more other registers, such as in rFLAGS register 218 to indicate processor states.

In some embodiments, while a SPECULATE instruction may begin a transaction in rollback mode, a different instruction (e.g., BEGIN) may begin a transaction in store-conditional mode.

Figure 6:
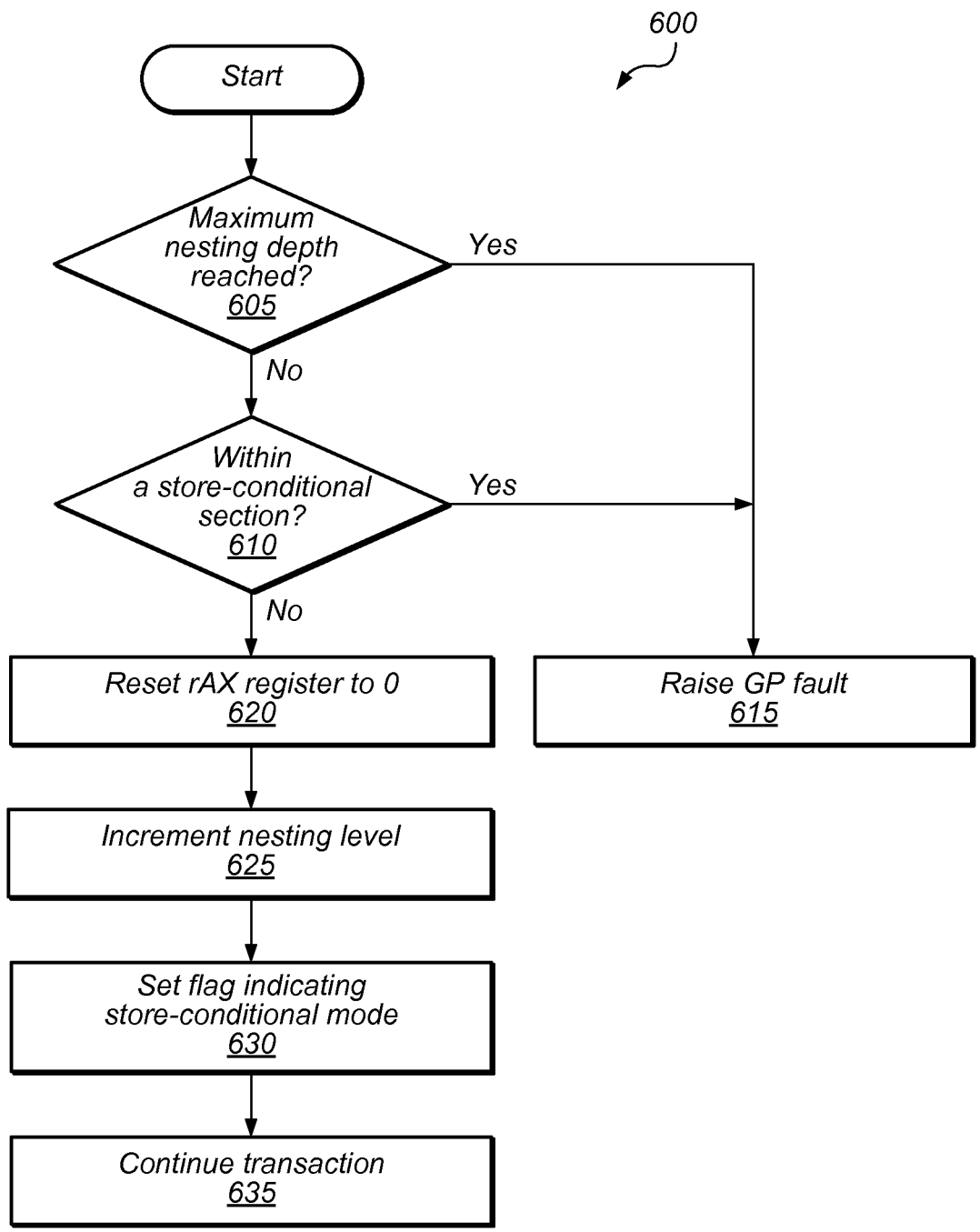
FIG. 6 is a flow diagram illustrating the steps of executing a BEGIN instruction to begin a speculative section in store-conditional mode, according to some embodiments.

FIG. 6 illustrates the steps of executing a BEGIN instruction, according to some embodiments. Method 600 may begin by determining one or more validity conditions for the transaction. In some embodiments, these conditions may be analogous to those checked when executing a SPECULATE transaction. For example, in method 600, executing BEGIN comprises determining whether a maximum nesting level has been reached (as in 605) and determining whether the current transaction is being nested within another store-conditional section (as in 610). If either condition is true (as indicated by the affirmative exits from 605 and 610 respectively), ASF mechanisms may be configured to raise a GP or other fault, as in 615. Otherwise, according to method 600, executing BEGIN may include resetting the rAX or other register (e.g., to zero), as in 620, incrementing the nesting level (as in 625), and setting a flag indicating that the current transaction is in store-conditional mode (as in 630) and proceeding with transactional execution of the transaction body (as in 635). In various embodiments, the flag set in 630 may be used to determine whether the current transaction is in store-conditional mode, such as in steps 510 and 610.

In some embodiments, ASF mechanisms may define various memory-reference instructions, called declarators, for designating which memory locations should be protected as part of a transaction (i.e., the memory locations for which atomic access is desired). For example, in some embodiments, ASF mechanisms may expose a declarator memory access instruction for reading memory that is analogous to the standard x86 MOV instruction. Like the traditional MOV instruction, an ASF-defined LOCK MOV instruction may be used for loading values from memory. However, according to some embodiments, if a thread reads a memory location inside of a transaction using the LOCK MOV instruction, then ASF mechanisms may add the memory cache block containing the first byte of the referenced memory location to the set of protected cache blocks. In some embodiments, software mechanisms may ensure that unaligned memory accesses do not span both protected and unprotected lines. According to some embodiments, a declarator instruction referencing an already protected cache block may behave like a regular memory reference and not change the protected status of the block. In some embodiments, declarators may not be permitted outside of a critical section (e.g., an exception may be raised). In some embodiments declarators outside of critical section may be treated like regular memory operations. This may be the case for some embodiments wherein store-conditional mode is available.

In some embodiments, ASF mechanisms may define declarators other than LOCK MOV instructions. For examples, instructions analogous to x86 PREFETCH and/or PREFETCHW may be used (e.g., LOCK PREFETCH, LOCK PREFETCHW). Like their x86 analogs, LOCK PREFETCH and LOCK PREFETCHW may be used to fetch a value from memory into cache for reading (PREFETCH) or for writing (PREFETCHW). However, unlike standard prefetches without a LOCK prefix, LOCK PREFETCH and LOCK PREFETCHW may make a memory location protected. In addition, in some embodiments, LOCK PREFETCH and LOCK PREFETCHW may also check the specified memory address for translation faults and memory-access permission (read or write, respectively) and generate a page fault if unsuccessful. In some embodiments, LOCK PREFETCH and LOCK PREFETCHW may generate a #DB exception when they reference a memory address for which a data breakpoint has been configured.

In some embodiments, once a memory location has been protected using a declarator, it may be modified again speculatively, but not nonspeculatively, within the transaction. For example, in some embodiments, after a memory location has been read using a LOCK MOV read instruction, the value stored in the memory location may be speculatively modified using an ASF-defined LOCK MOV store instruction. According to embodiments, such speculative updates may become visible only when the transaction is committed. According to such embodiments, if the transactional attempt aborts, then speculative updates are rolled back and/or otherwise discarded. In some embodiments, during transactional execution, a memory location that has been protected using a declarator may only be modified using a speculative store instruction. In such embodiments, if a thread in transactional mode attempts to modify the value of a protected memory location using conventional non-speculative store operations, ASF mechanisms may raise an exception/fault (e.g., #GP(0)).

In some embodiments, if a speculative store instruction (e.g., LOCK MOV) is executed outside of a critical section, then an exception may be raised. In other embodiments, such as those wherein store-conditional mode is available, speculative stores outside of a critical section may be treated as a no-op.

In various embodiments, declarator memory instructions may participate in a system's cache coherence protocol. For example, if a LOCK MOV or LOCK PREFETCH instruction for reading a memory location misses in cache, it may send a non-invalidating probe to other processors, as dictated by the system's cache coherence protocols. In another example, if a given cache line does not already reside in the local cache in exclusive/owned status, then modifying it using a LOCK MOV instruction may result in sending an invalidating probe to other processors, as dictated by the system's cache coherence protocols. In some embodiments, executing a LOCK PREFETCHW instruction may also result in sending an invalidating probe, etc.

Various ASF mechanisms may be used to monitor and/or enforce protected memory locations (e.g., protected cache blocks). In some embodiments, ASF mechanisms may include an extension to one or more of the system's caches (e.g., memory caches 230), to indicate which cache lines (i.e., blocks) are protected. For example, in one embodiment, each line in a given cache may comprise a "protected" flag, which is set if the cache line is protected in a currently executing transaction and unset if it is not protected. In some embodiments, the protected flag may comprise one or more bits.

In some embodiments, ASF mechanisms for tracking protected cache lines may comprise a locked line buffer. In such embodiments, when a value in a protected memory location is modified (e.g., using a LOCK MOV instruction), an entry may be made into the locked line buffer to indicate the cache block and the value it held before the modification. In such embodiments, in the event of an abort of the transaction, the entries of the locked line buffer may be used to restore the pre-transaction values of each protected cache line to the local cache. In such embodiments, the locked line buffer may participate in a cache coherence protocol of the system, as described below.

In other embodiments, instead of using a locked line buffer to undo memory stores as described above, various ASF implements may instead prevent store instructions to protected memory locations in a critical section from being written to cache and/or memory before the transaction is committed. For example, ASF may be configured to keep all memory modifications in an internal store buffer and forward buffered values to subsequent load operations in the transaction. In such embodiments, once the transaction commits, ASF mechanisms may allow the buffered store operations in the internal store buffer to be written back to the cache.

In some embodiments, due to the fixed capacity of various ASF hardware components, various limitations may exist on the number of memory locations that may be simultaneously protected during a transaction (or set of nested transactions). For example, as discussed above, according to some embodiments, an implementation may require that all protected memory locations simultaneously reside in a data cache (e.g., memory caches 230) for the duration of the critical section. In such an embodiment, if a protected line is evicted from the cache during a transaction (e.g., due to capacity constraints), the critical section may be aborted. For example, a critical section that happened to reference N+1 memory locations that all mapped to the same set in an N-way associative data cache may fail to complete since at least one protected cache line would be evicted from cache when protected memory location N+1 is accessed. However, if a transaction performs a more distributed reference pattern, then it may be able to concurrently protect more memory locations than N before any one cache index is exceeded and a protected line is displaced from the data cache.

In various embodiments, capacity limitations other than cache associativity may exist. For example, in embodiments in which a locked line buffer is used, the maximum number of concurrently protected modified memory locations may be determined by the capacity of the locked line buffer. In another example, in embodiments utilizing a store-buffering scheme, ASF hardware capacity may be dependent on the capacity of the store buffer (i.e., the maximum number of outstanding stores supported by the system pipeline).

In various embodiments, ASF mechanisms may guarantee that a critical section will not fail due to insufficient hardware capacity as long as the number of protected locations does not exceed a given minimum guaranteed capacity. In various embodiments, this guarantee may be made regardless of where in the cacheable address space protected memory locations reside. For example, in embodiments that require that all protected memory locations simultaneously reside in a data cache, the minimum guaranteed capacity may be dependent upon the data cache's associativity (i.e., size of associativity sets). In various embodiments, if a transaction exceeds the hardware capacity, then the transactional attempt may abort.

In some embodiments, ASF mechanisms may allow a thread executing a transaction to remove an unmodified protected memory location from the transaction's set of protected memory locations. In some embodiments, the thread may accomplish this by executing an explicit RELEASE instruction provided by ASF. In some embodiments, when a protected memory location is released (e.g., using the RELEASE instruction), then it is no longer monitored for contention with other threads. For example, in embodiments wherein a protected flag is utilized, the value of the protected flag associated with the released cache block may be modified to indicate that the block is no longer protected. Thus, by removing an unmodified protected memory location from the set of protected memory locations, a thread may avoid unnecessary data conflicts with other threads and/or exceeding an ASF implementation's hardware capacity, which may lead to transactional aborts. In some embodiments, a RELEASE instruction may or may not guarantee that the specified protected memory location will be released. In some embodiments, only protected cache lines that have not been modified may be released.

As described above, in some embodiments, if a transaction attempts to protect (using declarators) more memory locations (e.g., cache blocks) than the ASF implementation's capacity can support then the transaction may be aborted. In other embodiments, the abort may be executed in response to a fault being raised.

In various embodiments, transactional aborts may also be caused by conditions other than insufficient hardware capacity. For example, an abort may be caused by memory contention, that is, interference caused by another processor attempting to access protected memory locations. In various embodiments, ASF mechanisms may be configured to detect various cache coherence messages (e.g., invalidating and/or non-invalidating probes) that may be relevant to one or more protected cache lines and determine whether the probe indicates that a data conflict exists. In response to detecting a data conflict, the ASF-mechanism may abort a transactional attempt. For example, consider a first thread executing in transactional mode and protecting a memory location (i.e., reading a memory location using a declarator instruction). If a second thread subsequently attempts a store to the protected memory location, then the processor executing the second thread may send an invalidating probe to the processor executing the first thread, in accordance with the particular cache coherence protocol deployed by the system. If the first processor receives the invalidating probe while the memory location is still protected (e.g., before the first thread commits its transaction or otherwise releases the memory location) then a data conflict may exist. In such an instance, ASF mechanisms may be configured to detect that the invalidating probe is relevant to a protected memory location and in response, abort the first thread's transaction.

According to various embodiments, a transaction may be aborted if ASF mechanisms detect that an invalidating probe relevant to a protected cache line is received. In some embodiments, a transaction may also be aborted if ASF mechanisms detect that a non-invalidating probe relevant to a modified protected cache line is received.

FIG. 7 is a table summarizing a set of rules defining how various ASF implementations may handle data contention, according to some embodiments. The table of FIG. 7 describes the outcomes when a first thread executing on a first processor (CPU A) performs a given memory access operation on a given memory location, while a second thread on a second processor (CPU B) is executing a transaction that has protected that location. As described above, various cache coherence protocols allow memory caches to cache memory values in different "states", such as "shared" state for read-only access, or in "owned" or "exclusive" state for write access. The "Protected Shared" and "Protected Owned" columns correspond to a protected cache line being in shared and owned state respectively.

For example, the top entry in the table of FIG. 7 details how to handle a situation, according to one embodiment, where CPU A is executing in any mode (inside or outside of a critical section) and performs a read operation to a memory location that CPU B is protecting in either shared or owned state. According to the illustrated embodiment, if CPU B is protecting the location in owned state, then the transaction of CPU B aborts and otherwise, the transaction of CPU B does not abort. Similar outcomes would result if CPU A had executed a prefetch operation in any mode or if it had executed a LOCK MOV or LOCK PREFETCH operation from inside of a transaction. However, according to the illustrated embodiment, if CPU A were to perform a write or PREFETCHW operation to the memory location in any mode or a LOCK PREFETCHW operation to the memory location in transactional mode, then CPU B would abort the transaction regardless of whether it held the memory location in shared or owned states.

In some embodiments, a transaction may be aborted explicitly using an ASF-defined ABORT instruction. In some embodiments, a transaction may be aborted because it attempts to execute a disallowed instruction, such as one that results in a far control transfer. In various embodiments, far control transfers may include instructions that transfer control to a location in another segment, such as by changing the content of the CS register in x86 implementations. Far control transfers may include traps, faults, exceptions, NMIs, SMIs, unmasked and nondeferred interrupts, disallowed instructions converted into exceptions, etc. In some embodiments, disallowed instructions may include privileged instructions, such as those that must be executed at an elevated privilege level (e.g., CPL=0), instructions that cause a far control transfer or an exception, and any instructions that may be intercepted by a secure virtual machine (SVM) hypervisor. In various embodiments, disallowed instructions may include:

FAR JMP, FAR CALL, FAR RET
SYSCALL, SYSRET, SYSENTER, SYSEXIT
INT, INTx, IRET, RSM
BOUND, UD2
PUSHF, POPF, PAUSE, HLT, CPUID, MONITOR, MWAIT, RDTSC, RDTSCP, RDPMC
IN, OUT
All privileged instructions
All SVM instructions As used herein, the term SVM instructions may refer to any instructions that a virtual machine monitor and/or virtual machine may use to interact across the boundary of the virtual machines. In various embodiments, such instructions may include, but are not limited to, VMRUN (i.e., run a virtual machine), VMLOAD/VMSAVE (i.e., load/save various virtual machine state into a processor and/or to a save area in memory), and/or VMMCALL (i.e., to execute a system call to a virtual machine monitor).

In various embodiments, a virtual machine monitor may prevent execution of a configurable set of instructions on a processor, such as by intercepting those operations. Such instructions may be referred to herein as "interceptable". According to some embodiments, various or all SVM instructions may be interceptable. In some embodiments, the execution of any interceptable instruction inside of a transaction may cause the transaction to be aborted.

In some embodiments, ASF mechanisms may prohibit instructions within a transaction that operate differently in a virtualized environment (e.g., virtual machine) than in a native environment. By imposing such restrictions, embodiments may be fully virtualizable and can be used within a virtual machine without suffering from the unpredictable or incorrect behavior that such instructions may cause when executed in a virtual environment. For example, in some embodiments, all interceptable instructions may be prohibited inside of a transaction. In some embodiments, virtual machine specific instructions and/or privileged instructions may be prohibited.

In some embodiments, attempting to execute disallowed or far control transfer causing instructions inside of a critical section may generate an exception (e.g., #GP exception), which may cause the transactional attempt to be aborted. In some embodiments, the far control transfer may be executed after the abort. In such embodiments, upon return from the far control transfer (or the fault handler invoked by the exception caused by the disallowed transaction), a software recovery routine may be executed.

As described above, in various embodiments, ASF mechanisms may abort a transactional attempt due to hardware capacity limitations, memory contention with another thread, the thread executing a disallowed instruction (e.g., far control transfer), and/or if the thread executes an explicit ABORT instruction.

Figure 8:
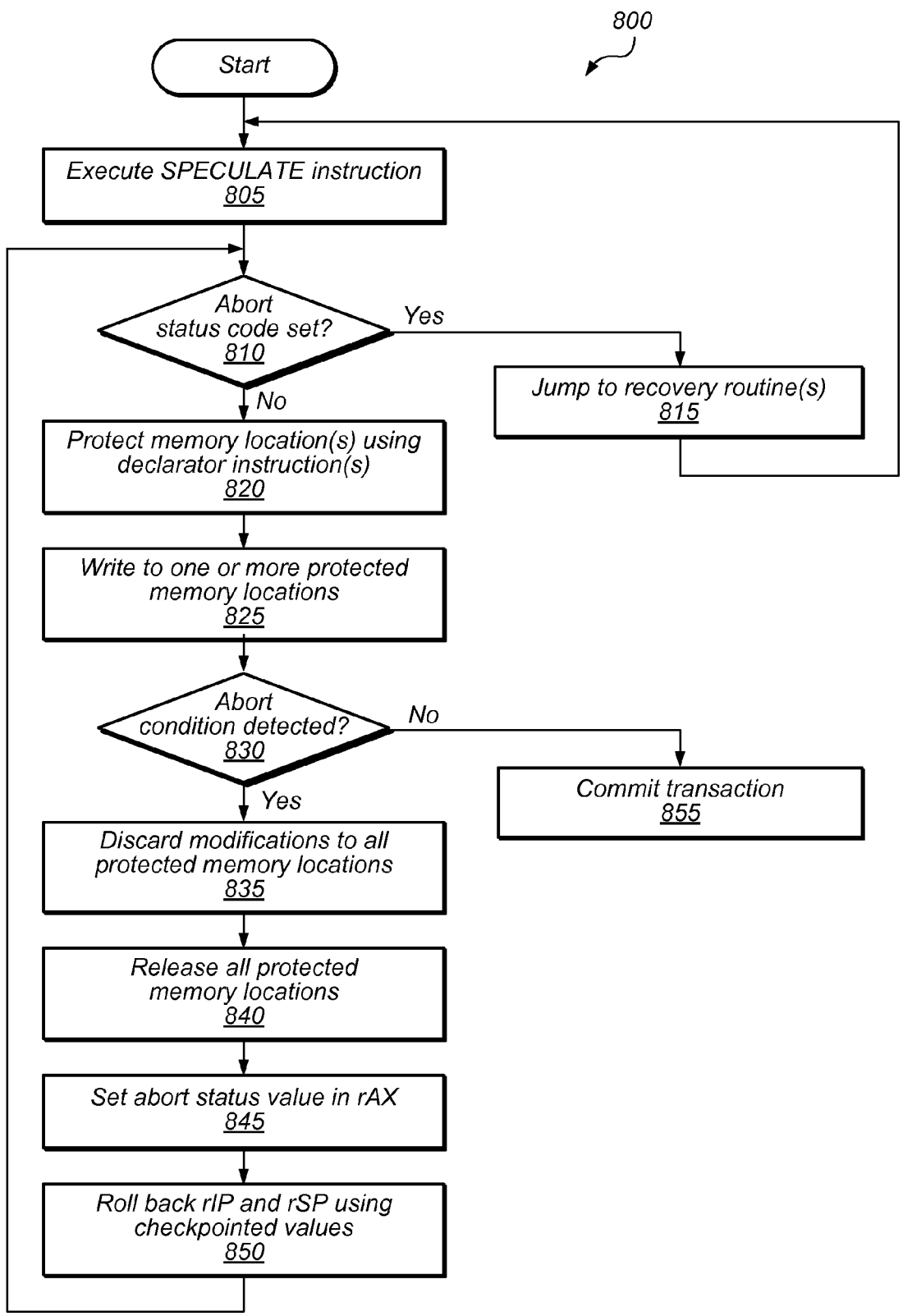
FIG. 8 is a flow diagram illustrating a method by which, according to various embodiments, ASF mechanisms may execute a transaction in rollback mode.

FIG. 8 is a flow diagram illustrating a method by which, according to various embodiments, ASF mechanisms may execute a transaction in rollback mode. According to method 800, a thread may begin a transaction in rollback mode by first executing a SPECULATE instruction. As detailed in FIG. 5, executing SPECULATE may include checkpointing (i.e., saving) the instruction and stack pointer values for later use. However, in some embodiments, if the transaction is nested within another transaction, then a checkpoint may already exist and the SPECULATE instruction would not result in another checkpoint being recorded, as in FIG. 5.

After executing the SPECULATE instruction, the thread may determine whether an abort status has been set, as in 810, and if so, jump to and execute a recovery routine, such as 815. In some embodiments, software may determine whether an abort status code has been set by examining one or more registers (e.g., rAX register) where various abort status codes may be placed. In some embodiments, different abort status codes may indicate whether and for what reason the previous transactional attempt was aborted. In various embodiments, different abort status codes may be set, such as those indicating that the previous transactional attempt was not aborted or was aborted due to contention, capacity constraints, execution of a disallowed instruction, a far control transfer, or other reasons. In some embodiments, recovery routine(s) 815 may take different recovery actions depending on the determined abort status code. For example, in some instances, recovery routine(s) 815 may determine that the thread should not reattempt transactional execution using ASF.

According to the method 800, the thread may then begin to execute the transaction body, which may include protecting some number of protected memory locations, as in 820. In some embodiments, protecting memory locations may be performed using various declarator instructions as described above, such as LOCK MOV. In some embodiments, a protected flag corresponding to the cache block of each protected memory location may be set to indicate that the location is protected. According to the illustrated example of FIG. 8, executing the transaction body may further include writing to one or more protected memory locations, as in 825. In some embodiments, this may be performed by using various speculative store operations as described above, such as LOCK MOV. In embodiments utilizing a locked line buffer, writing to a protected memory location may include storing the unmodified value to the locked line buffer and then performing the write operation to a local cache.

According to method 800, an abort condition may be encountered during execution, as indicated by the affirmative exit from 830. As described above, in different instances, an abort condition may be caused by contention with other threads, capacity limitations, far control transfers, disallowed instructions, and/or by the thread executing an explicit ABORT instruction. If an abort condition is detected (affirmative exit from 830) then ASF mechanisms may be configured to discard any modifications made by the partially executed transaction to all protected memory locations.

In various embodiments, discarding modifications to all protected memory locations, as in 835, may be accomplished in different manners, dependent on the particular speculative execution mechanism being used. For example, in some embodiments wherein ASF utilizes a store buffer to delay the write-back phase of store operations to protected memory as described above, discarding modifications (as in 835) may comprise discarding any store operations to protected memory locations that are waiting in the store buffer. In some embodiments in which a locked line buffer is used, discarding modifications (as in 835) may comprise writing the old values of each memory location (values of each memory location before it was modified by the transaction), stored in the locked line buffer, back to the local cache.

According to method 800, aborting the transaction in rollback mode may further comprise releasing all protected memory locations, as in 840, such that they are no longer protected. For example, releasing the protected memory locations may include unsetting one or more protected flags associated with each memory location protected by the aborted transaction. In embodiments utilizing locked line buffers, releasing the protected memory locations may further include removing the entries of the locked line buffer corresponding to the protected memory locations modified in the transaction.

According to the illustrated embodiment, ASF mechanisms may then determine the cause of the abort to determine an appropriate abort status code. In some embodiments, ASF mechanisms may communicate the abort status code to software mechanisms by encoding the code into a status register (e.g., rAX register 216), as in 845.

In some embodiments, a status register (e.g., the rAX register) may be used to simultaneously hold a plurality of status codes. For example, some subset of the status register bits may be used to hold an abort status code while one or more other subsets may hold additional information. For example, if the abort was caused by the thread executing an ABORT instruction, a subset of the bits of status register may hold one or more values passed to the ABORT instruction by the thread when invoked. In some embodiments, a subset of the bits of the status register may also hold an indication of the nesting depth of the current transaction. In further embodiments, different subsets of bits in the status register may hold various other sets of status information.

According to method 800, ASF mechanisms may then roll back execution to the beginning of the transaction, such as by rolling back the instruction and stack pointers to the checkpointed values, as in 850. In some instances, if the transaction is a top level transaction, then the checkpoint may have been recorded as part of executing the SPECULATE instruction (as in 805) and rolling back execution may result in returning control flow to the start of the transaction body, as indicated by the feedback loop from 850 to 810. In other embodiments, if the transaction is a nested transaction, then the checkpoint may have been recorded in the top level transaction and rolling back execution may result in returning control flow to the beginning of the top-level transaction's body. Thus, in some embodiments, aborting a nested transaction may comprise aborting all parent transactions in which the nested transaction is nested.

According to method 800, the transaction body may be attempted until it completes without an abort condition being detected. If the transactional attempt completes without abort, as indicated by the negative exit from 830, then the thread may commit the transaction, as in 855. In some embodiments, committing the transaction may comprise executing a COMMIT instruction.

Figure 9:
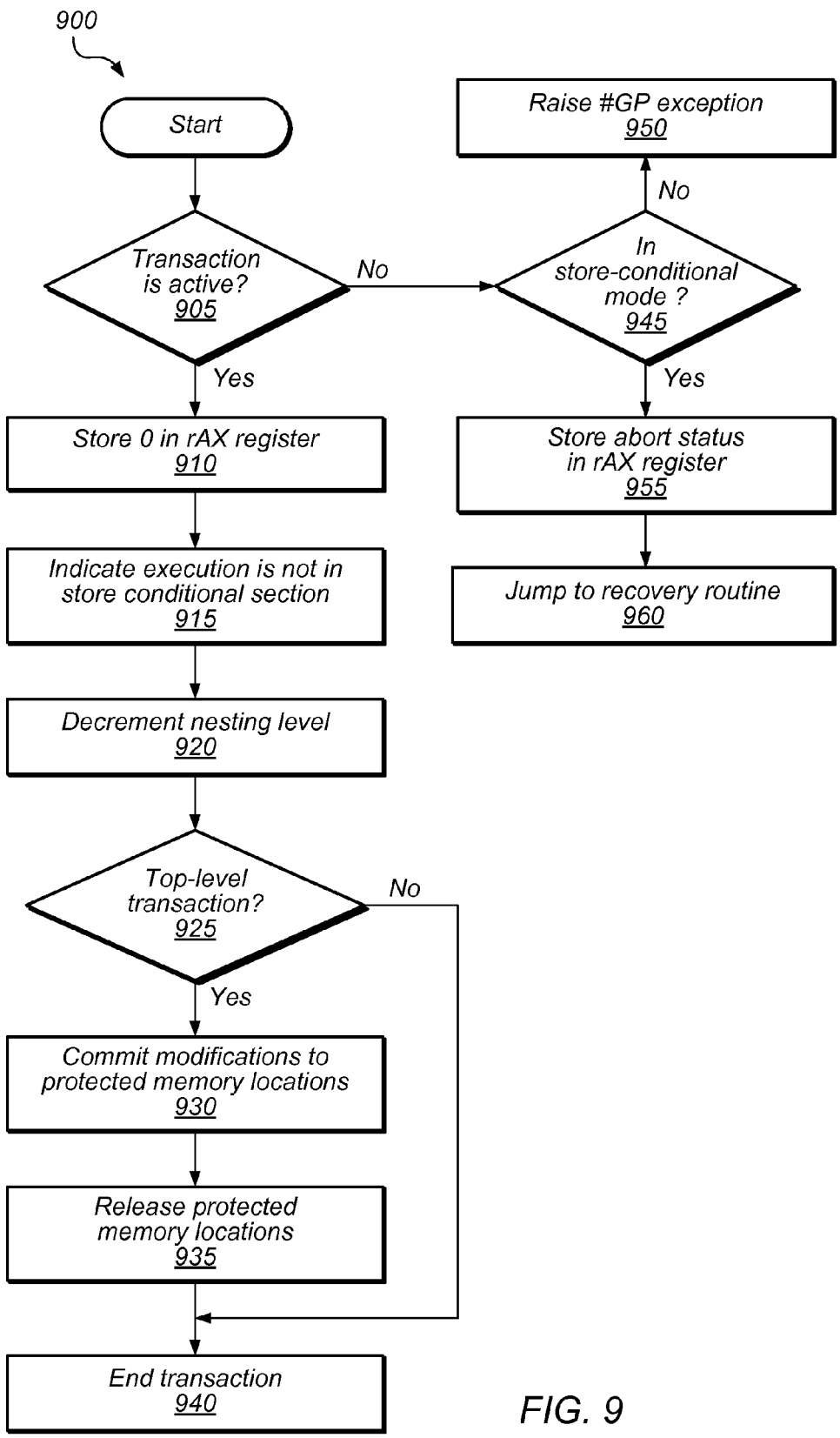
FIG. 9 illustrates a method for committing a transaction, such as by executing a COMMIT instruction, according to some embodiments.

FIG. 9 illustrates a method for committing a transaction, such as by executing a COMMIT instruction, according to some embodiments.

FIG. 9 is a flow diagram illustrating a method by which ASF mechanisms may abort a transaction that is executing in store-conditional mode, according to various embodiments. According to the illustrated embodiment, method 900 may begin by determining if a transaction is active, as in 905. If a transaction is active, as indicated by the affirmative exit from 905, then the transaction did not abort during execution. Thus, in some embodiments, a code indicating a successful execution may be stored in a status register. For example, in some embodiments, the rAX register may be cleared as in 910, such as by storing a 0 value in the register.

According to method 900 committing the transaction may further comprise setting a flag to indicate that execution is not in store-conditional mode, as in 915, and decrementing a counter that indicates the nesting level of the active transaction, as in 920. In some embodiments, if the transaction being committed is a nested transaction, as indicated by the negative exit from 925, then the transaction may be ended, as in 940. Thus, in such embodiments, speculative stores executed inside of a nested transaction may remain speculative (and susceptible to contention) even after the nested transaction has committed.

According to the embodiment of FIG. 9, if the transaction is a top-level transaction, as indicated by the affirmative exit from 925, then ASF mechanisms may commit all modifications to protected memory locations so that they are globally visible to other threads in the system, as in 930. In various embodiments, committing modifications to protected memory locations may involve different actions, which may depend on the speculative mechanism used. For example, in embodiments where speculative store operations to protected memory are delayed in the store buffer until the transaction commits, committing the modifications may imply performing a write-back of these values to memory (e.g., to local cache and/or to main memory). In various embodiments, committing a top level transaction may further comprise releasing all protected memory locations, as in 935, such that they are no longer protected by ASF mechanisms. For example, in embodiments wherein a protected flag is used to indicate protected cache blocks, the value of each flag associated with each protected cache block may be set to indicate that the cache block is no longer protected. Thus, ASF mechanisms need not ensure atomicity with respect to released memory locations.

In some embodiments, a thread attempts to commit a transaction that is not active, as indicated by the negative exit from 905, then the behavior may depend on whether or not the mode of execution is store-conditional or rollback. If the execution mode is rollback, as indicated by the negative exit from 945, then ASF mechanisms may be configured to raise an exception, such as a #GP exception. Otherwise, if the execution mode is store-conditional (as indicated by the affirmative exit from 945), then ASF mechanisms may be configured to store the abort status code in a status register, such as rAX (as in 955) and jump to a recovery routine, as in 960. The transaction may then be reattempted as needed.

Figure 10:
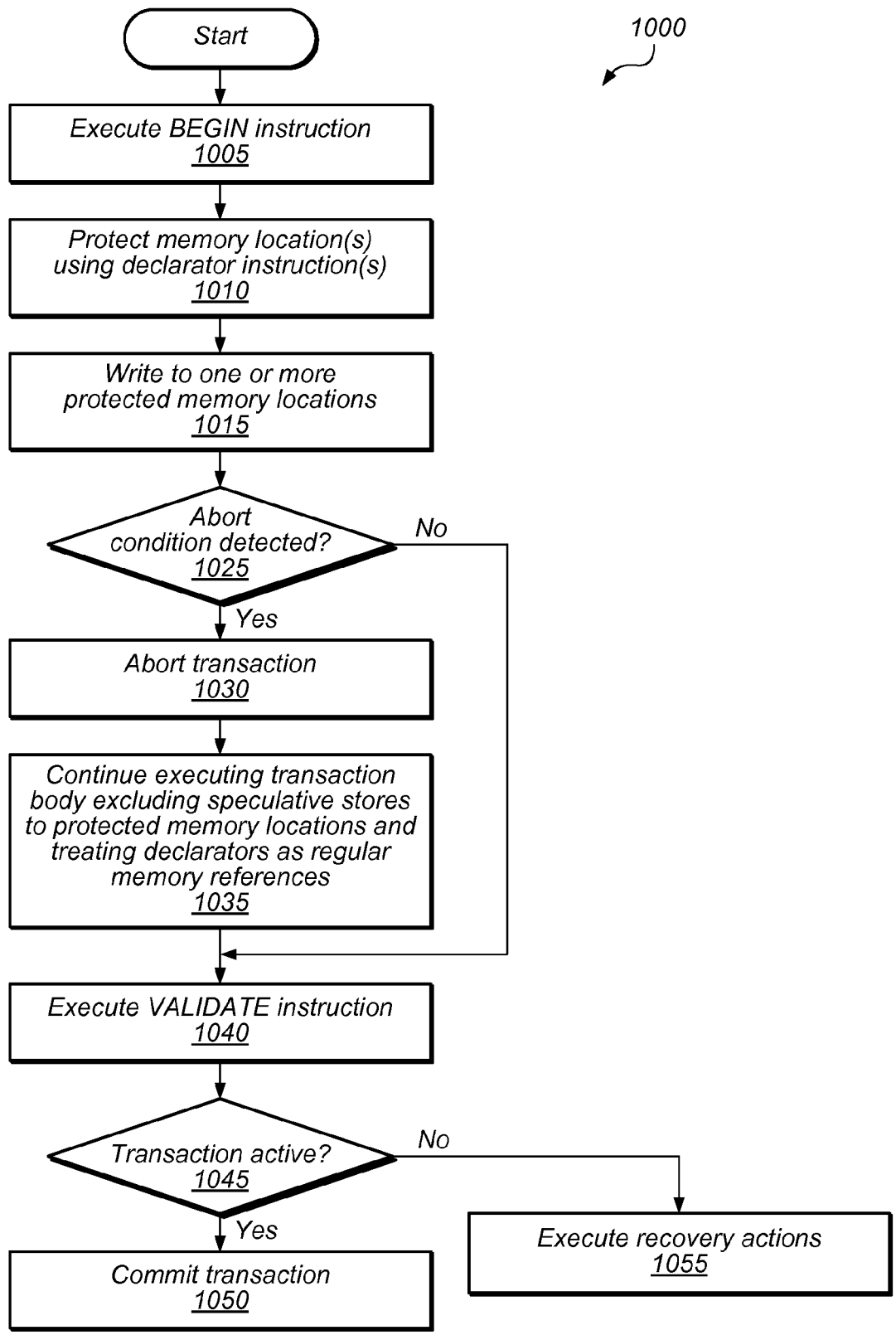
FIG. 10 is a flow diagram illustrating a method for executing a transaction in store-conditional mode, according to some embodiments.

FIG. 10 is a flow diagram illustrating a method for executing a transaction in store-conditional mode, according to some embodiments. According to method 1000, executing a transaction in store-conditional mode may begin by executing a BEGIN instruction, as in 1005. In some embodiments, executing a BEGIN instruction may include executing method 600 of FIG. 6. In various embodiments, the BEGIN instruction may set one or more flags that may be used to determine that a transaction executing in store-conditional mode is active.

According to the illustrated embodiment, the transaction may then protect one or more memory locations using declarator instructions, as in 1010. In some instances, the transaction may also attempt to write to one or more of the memory locations protected in 1010, as in 1015.

According to method 1000, if ASF mechanisms do not detect an abort condition (e.g., contention, capacity limits exceeded, far control transfer, disallowed transaction, etc.), as in the negative exit from 1025, then the thread may commit the transaction, as in 1040. In some embodiments, committing the transaction, as in 1025, may include executing a commit instruction, such as that illustrated by FIG. 9.

In some embodiments, if an abort condition is detected during execution, as indicated by the affirmative exit from 1025, then the transaction may be aborted, as in 1030. In some embodiments, aborting the transaction may include undoing or otherwise discarding any modifications to protected memory locations made by store operations of the transaction. In some embodiments, an abort status code indicating the cause of the abort (e.g., conflict, capacity, disallowed transaction, etc.) may be recorded as part of aborting the transaction, as in 1030.

According the illustrated embodiment, after the transaction is aborted (as in 1030), the control flow may remain in the transaction body and the transaction may continue to be executed with the exclusion of speculative stores to protected memory locations, as in 1035. In some embodiments, after the transactional attempt is aborted, declarator instructions appearing in the transaction body may be executed as regular memory references (e.g., read instructions that do not set a protected flag for the memory location) and/or accesses to protected memory locations may be ignored (e.g., treated as a no-op instruction).

According to some embodiment, a thread executing a transaction in store-conditional mode may be configured to verify whether or not the transaction has been aborted. For example, in some embodiments, the thread may execute a VALIDATE instruction, as in 1040, to determine whether a transaction is still active (i.e., not yet aborted). In some embodiments, the VALIDATE instruction may be executable to copy the current abort status code into a program readable status register (e.g., into the rAX register) where the value may be read by software. If the transaction has not been aborted, then the VALIDATE instruction may be executable to set the status register to a value indicating that the transaction is still active (e.g., set rAX to 0 value).

According to the illustrated embodiment, if the thread executes a VALIDATE instruction, it may then check the status (e.g., rAX) register to determine whether the transaction has been aborted. If the transaction is not active, as indicated by the negative exit from 1045, then the thread may execute some recovery actions, as in 1055. According to various embodiments, executing the recovery actions may include releasing any protected memory locations and/or returning program control to the start of the transaction for re-execution. If the transaction is still active, as indicated by the affirmative exit from 1045, then the thread may continue executing the transaction and/or commit the transaction, as in 1050.

According to the illustrated embodiment, once the thread finishes executing the transaction, it may attempt to commit the transaction, as in 1050. As indicated above, committing the transaction may include executing a commit instruction, such as that illustrated in FIG. 9. As part of executing the commit instruction, ASF mechanisms may detect whether the transaction is active (as in 905) and if not, store an abort status in a software readable register (e.g., in rAX as in 955) and jump to a recovery routine (as in 960), which may be analogous to or the same as recovery actions 1055. Executing the recovery routine may include releasing any protected memory locations and/or returning program control to the start of the transaction for re-execution. In some embodiments, if the section is nested within one or more rollback mode transactions, those parent transactions may be aborted and control may be returned to the checkpoint taken by the highest level SPECULATE instruction, as described above in reference to FIG. 8.

In various embodiments, a programmer may compose applications that utilize a transactional memory programming model for ASF-enabled systems. In such embodiments, a programmer may configure a program to begin a transaction by executing a transactional start instruction (e.g., SPECULATE, BEGIN, etc), execute one or more accesses to protected memory (e.g., LOCK MOV, etc.), and then execute one or more instructions to commit the transaction (e.g., COMMIT).

In some embodiments, a program may be written to utilize an ASF-enabled transactional memory programming model in conjunction with other concurrency control mechanisms, such as non-ASF, lock-based code. For example, consider a data structure such as a B-tree. Concurrent threads in a shared-memory application may perform frequent insert and delete operations to the B-tree in a transactional, lock-free manner using ASF-based transactional memory. Occasionally the B-tree may need to be rebalanced for efficiency, an operation that may include atomically operating on many memory locations of the B-tree. However, since this operation may include protecting many memory locations, attempting to complete it as a transaction may result in frequent aborts. For example, conflict aborts may result from conflicts with other concurrently executing threads that perform delete and/or insert operations on the B-tree. In another example, protecting so many memory locations simultaneously may be beyond the capacity of the ASF implementation, therefore causing capacity aborts of the transaction. In such situations, rather than using transactional memory to execute the rebalancing operation, the operation may be more efficient if configured to use traditional, lock-based mutual exclusion. For example, a lock may be associated with the entire B-tree and may be acquired for mutually exclusive access to the B-tree. In this example, the rebalancing operation may begin by acquiring lock for the B-tree, then executing the rebalancing operation, and then releasing the lock. However, in such instances, care must be taken to ensure that code that utilizes lock-based mutual exclusion semantics interoperates safely with code that utilizes ASF-based transactional memory semantics.

Figure 11:
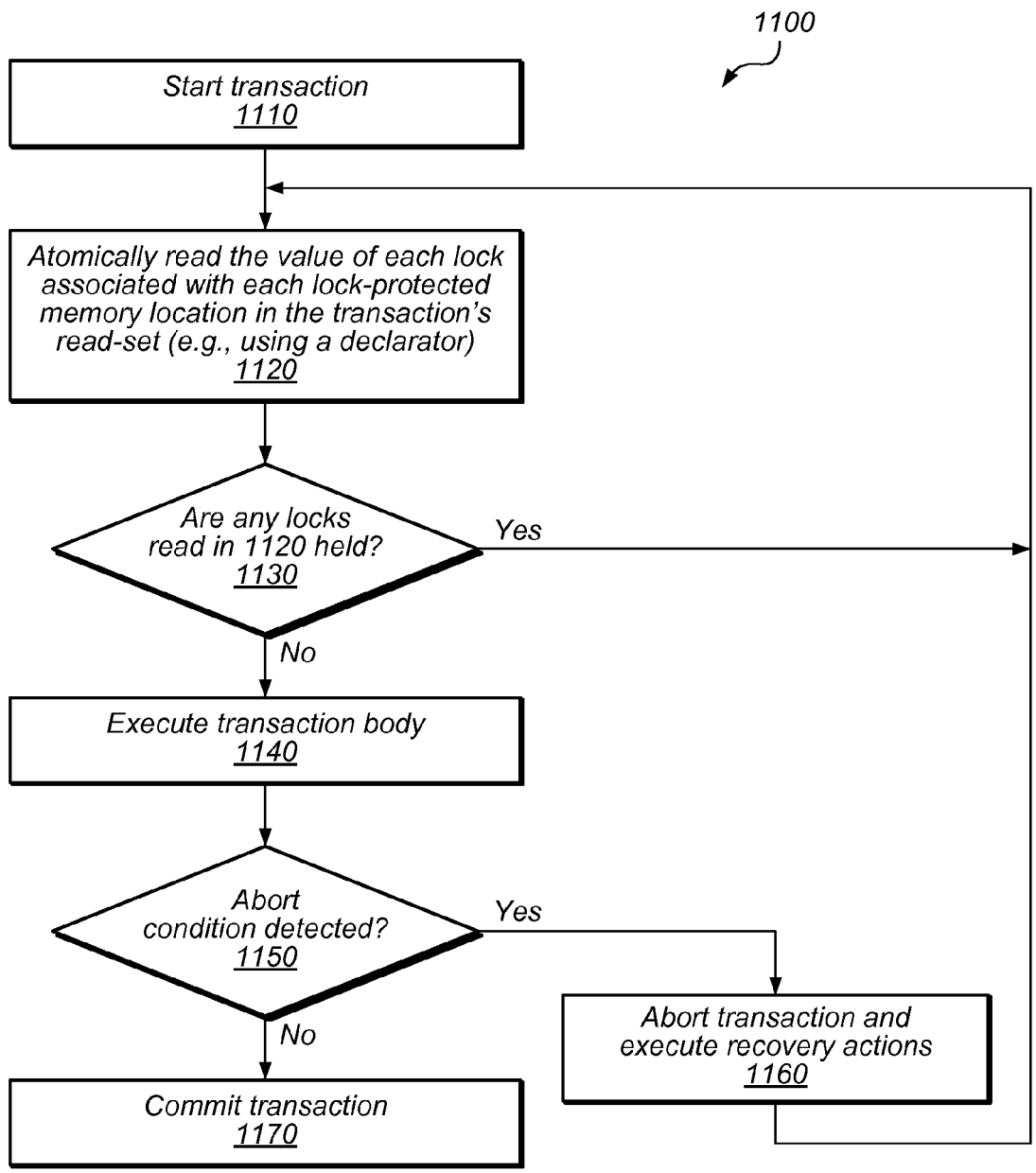
FIG. 11 is a flowchart illustrating a method for configuring ASF-based transactions to interoperate with lock-based code, according to one embodiment.

FIG. 11 is a flowchart illustrating a method for configuring ASF-based transactions to interoperate with lock-based code, according to one embodiment. According to the illustrated embodiment, a thread may begin a transaction, as in 1110, such as by executing a SPECULATE or BEGIN instruction, as described above.

The set of memory locations that are protected inside of a transaction may be referred to herein as the read-set of the transaction. In the presence of lock-based code, the read-set of a transaction may include one or more memory locations that are associated with locks. Any memory location associated with and protected by a lock may be referred to herein as lock-protected.

According to the illustrated embodiment, a thread may be configured to atomically read (e.g., using a declarator operation) the value of each lock associated with each lock-protected memory location in the transaction's read-set, as in 1120. Thus, by atomically reading the values of the locks, the thread adds the locks to the read-set of the transaction (i.e., ASF mechanisms monitor the locks and protect them as part of the transaction). For example, in the B-tree example above, a transactional insert operation may begin by first atomically reading the value of a lock associated with the entire B-tree structure. In some embodiments, atomically reading the value of the lock may include reading the lock value using a declarator operation.

According to the illustrated embodiment, the thread may then determine if any of the locks read in step 1120 are held. If any are held, as indicated by the affirmative exit from 1130, then the thread may retry the transaction. In some embodiments, the thread may continue to reread the values of each lock until all of the locks are free, as indicated by the negative exit from 1130. In some embodiments, if any of the locks are held, then the thread may abort the transaction (e.g., by executing an ABORT instruction) and then reattempt executing the transaction. In other embodiments, if any of the locks are held, the thread may attempt to roll back any modifications that the transaction has made to values in protected memory locations and then to commit the transaction.

According to the illustrated embodiment, once the thread detects that no lock read in 1120 is held, as indicated by the negative exit from 1130, the thread may continue to execute the transaction body, as in 1140. In the illustrated embodiment, since the memory locations of various locks are protected using a declarator operation, any change to the value of the lock (e.g., a different thread acquiring the lock) may cause a conflict abort of the transaction. Therefore, an abort condition is detected during transactional execution (e.g., a conflict abort due to a lock being acquired), then ASF-mechanisms and/or the thread may abort the transaction and execute some recovery actions (as in 1160) and reattempt the transaction (as indicated by the feedback loop from 1160 to 1120). For example, continuing the B-tree example from above, if a different thread attempts to acquire the lock associated with the B-tree (e.g., as part of performing a rebalancing operation), then a cache coherence message may be sent to the executing thread, causing a conflict abort of the insert operation transaction.

According to the illustrated embodiment, if no abort condition is detected (as indicated by the negative exit from 1150), then the thread may commit the transaction, as in 1160.

Figure 12:
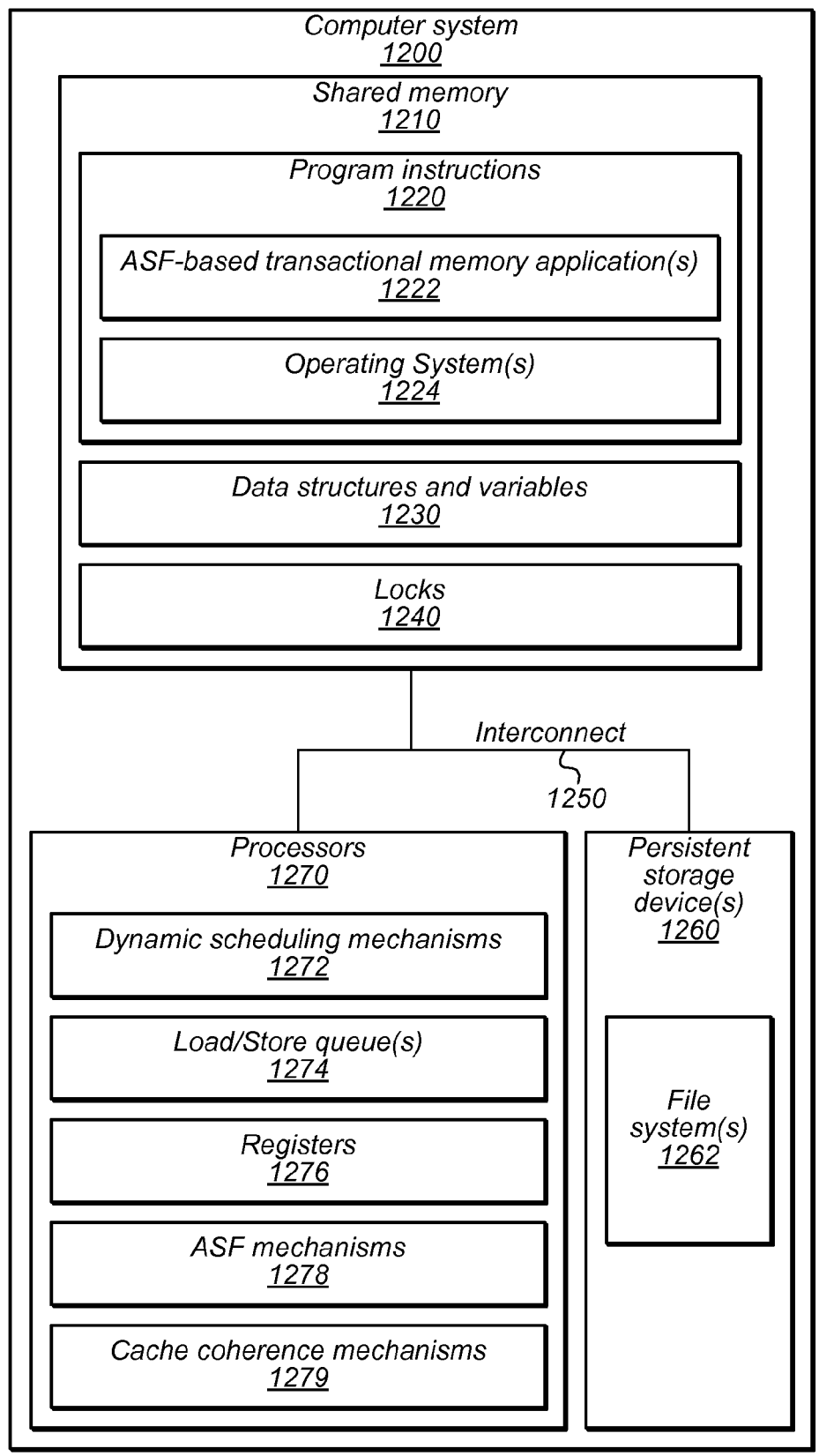
FIG. 12 illustrates one embodiment of a computer system configured to implement various embodiments of ASF, as described herein.

FIG. 12 illustrates one embodiment of a computer system configured to implement various embodiments of ASF, as described herein. Computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 1200 may include a plurality of processors 1270, each of which may include multiple cores, any of which may be single or multi-threaded (e.g., simultaneous multi-processing, Hyperthreading™, etc.). In some embodiments, processors 1270 may include dynamic scheduling mechanisms 1272, such as those capable of delaying speculative stores in load/store queues 1274 for implementing a speculative store buffer, as described herein. In some embodiments, processors 1270 may include various load, store, and/or load/store queues, such as 1274, for holding in-flight memory operations in the processor pipeline. Processors 1270 may also include registers 1276, such as rAX, rFLAGS or other special purpose registers, such as ones used for recording nesting depth, transactional mode, or status (active vs. inactive) of a transaction. In some embodiments, processors 1270 may include any number of ASF hardware transactional memory mechanisms 1278, as described herein. For example, ASF mechanisms 1278 may include a locked line buffer and/or hardware logic for monitoring memory locations protected by an active transaction. In some embodiments, processors 1270 may also include various cache coherence mechanisms 1279, which may be use to implement different cache coherence protocols (e.g., MESI, MOESI, etc.) and may be used by ASF mechanisms to detect conflict aborts, as described herein.

The computer system 1200 may also include one or more persistent storage devices 1260 (e.g. optical storage, magnetic storage, hard drive, tape drive, solid state memory, etc), which may store files, for example, by using a file system, such as file system 1262. Computer system 1200 may include one or more memories 1210 (e.g., one or more of cache, SRAM, DRAM, RDRAM, EDO RAM, DDR 10 RAM, SDRAM, Rambus RAM, EEPROM, etc.) shared by the multiple processors. Various embodiments may include fewer or additional components not illustrated in FIG. 12 (e.g., video cards, audio cards, additional network interfaces, peripheral devices, a network interface such as an ATM interface, an Ethernet interface, a Frame Relay interface, etc.)

Processors 1270, storage device(s) 1260, and shared memory 1210 may be coupled to system interconnect 1250. One or more of the system memories 1210 may contain program instructions 1220. Program instructions 1220 may be encoded in platform native binary, any interpreted language such as Java™ byte-code, or in any other language such as C/C++, Java™, etc or in any combination thereof.

Program instructions 1220 may include program instructions executable to implement one or more ASF-based transactional memory applications 1222. Each application 1222 may be multithreaded and may be configured to utilize ASF transactional memory mechanisms. In some embodiments, one or more of applications 1222 may be configured to operate using both ASF transactional memory instructions as well as mutual exclusion locks, as described herein. In such embodiments, shared memory 1210 may include various data structures and variables 1230, any of which may be associated with one or more mutual exclusion locks 1240.

In some embodiments, program instructions 1220 and/or ASF-based transactional memory applications 1222 may be provided as an article of manufacture that may include a computer-readable storage medium having stored thereon instructions that may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of tangible medium suitable for storing program instructions. In addition, program instructions may be communicated using intangible media—optical, acoustical or other form of propagated signal (e.g., carrier waves, infrared signals, digital signals, etc.).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:
1. A system, comprising:
a processor of a plurality of processors coupleable to a shared memory;
wherein the processor is configured to initiate execution of a section of code according to a first transactional mode of the processor, wherein the processor is configured to execute a plurality of protected memory access opera- tions to the shared memory within the section of code as a single atomic transaction with respect to the plurality of processors;

wherein the processor is configured to initiate, within the section of code, execution of a subsection of the section of code according to a second transactional mode of the processor;

wherein the first and second transactional modes are each associated with respective recovery actions that the processor is configured to perform in response to detecting an abort condition; and wherein the recovery actions associated with the second transactional mode comprise:
discarding any modifications to the shared memory made by one or more of the plurality of protected memory access operations of the subsection of code; and
continuing execution of the subsection of code without executing any store operations of the plurality of protected memory access operations that are within the subsection of code.

2. The system of claim 1, wherein the recovery actions associated with the first transactional mode comprise:
discarding any modifications to the shared memory made by one or more of the plurality of protected memory access operations; and
modifying values held in one or more registers to return program control flow to the start of the section of code.

3. The system of claim 1, wherein in response to detecting an abort condition during execution of the subsection of code, the processor is further configured to abort execution of the section of code, wherein said aborting comprises performing the recovery actions associated with the first transactional mode for the section of code.

4. The system of claim 1, wherein the processor is further configured to execute the section of code according to the first transactional mode in response to executing an instruction indicative of the first transactional mode at the start of the section of code, and wherein the processor is further configured to execute the subsection of code according to the second transactional mode in response to executing an instruction indicative of the second transactional mode at the start of the subsection of code.

5. The system of claim 4, wherein the processor is configured to execute the instruction indicative of the first transactional mode by recording a checkpoint at the start of the section of code, wherein said recording includes recording one or more respective values of one or more hardware registers of the processor.

6. The system of claim 1, wherein the section of code comprises a group of one or more unprotected memory access operations to the shared memory distinct from the protected memory access operations, and wherein the processor is further configured to execute the group of unprotected memory access operations such that the group is not guaranteed to be executed as a single atomic transaction with respect to the plurality of processors.

7. A method, comprising:
a processor of a plurality of processors coupled to a shared memory executing a section of code comprising a plurality of protected memory access operations to the shared memory as a single atomic transaction with respect to the plurality of processors, wherein the processor is configured to execute the section of code according to a first transactional mode;
wherein executing the section of code includes the processor executing a subsection of the section of code, wherein the processor is configured to execute the subsection according to a second transactional mode; and
wherein the first and second transactional modes are each associated with different respective recovery actions that the processor is configured to perform in response to detecting an abort condition, wherein the abort condition indicates that the executing section or subsection of code is not being executed as a single atomic transaction with respect to the plurality of processors;
wherein the recovery actions associated with the second transactional mode comprise:
discarding any modifications to the shared memory made by one or more of the plurality of protected memory access operations of the subsection of code; and
continuing execution of the subsection of code without executing any store operations of the plurality of protected memory access operations that are within the subsection of code.

8. The method of claim 7, wherein the recovery actions associated with the first transactional mode comprise:
the processor discarding any modifications to the shared memory made by one or more of the protected memory access operations; and
the processor modifying values held in one or more registers to return program control flow to the start of the section of code.

9. The method of claim 7, the method further comprising:
detecting an abort condition during execution of the subsection of code; and
aborting the section of code by performing one or more recovery actions associated with the first transactional mode.

10. The method of claim 7, further comprising the processor executing an instruction indicative of the first transactional mode at the start of the section of code and the processor executing an instruction indicative of the second transactional mode at the start of the subsection of code.

11. The method of claim 10, wherein said executing an instruction indicative of the first transactional mode comprises recording a checkpoint at the start of the section of code, and wherein said recording includes recording one or more respective values of one or more hardware registers of the processor.

12. The method of claim 7, wherein the section comprises a group of one or more unprotected memory access operations distinct from the protected memory access operations, and wherein the method further comprises executing the group of unprotected memory access operations such that it is not guaranteed to be executed as a single atomic transaction with respect to the plurality of processors.

13. An article of manufacture comprising a non-transitory computer-readable storage medium having program instructions stored thereon that, if executed by a processor in a plurality of processors that is coupled to a shared memory, cause the processor to perform a method comprising:
initiating execution of a section of code according to a first transactional mode of the processor, wherein the first transactional mode is associated with a first set of recovery actions, wherein the section of code includes a plurality of protected memory access operations to the shared memory, and wherein execution of the section of code includes executing the plurality of protected memory access operations as a single atomic transaction with respect to the plurality of processors; and
while executing the section of code, initiating execution of a subsection of the section of code according to a second transactional mode of the processor, wherein the second transactional mode is associated with a second set of recovery actions that is not identical to the first set of recovery actions;

wherein the processor is configured to perform one or more of the second set of recovery actions in response to detecting an abort condition during execution of the subsection of code; and wherein the processor is configured to perform one or more of the first set of recovery actions in response to detecting an abort condition during execution of a portion of the section of code for which a transactional mode other than the first transactional mode is not specified;

wherein the second set of recovery actions comprise:
discarding any modifications to the shared memory made by one or more of the plurality of protected memory access operations of the subsection of code; and continuing execution of the subsection of code without executing any store operations of the plurality of protected memory access operations that are within the subsection of code.

14. The article of manufacture of claim 13, wherein the first set of recovery actions comprise:
discarding any modifications to the shared memory made by one or more of the plurality of protected memory access operations; and modifying values held in one or more registers to return program control flow to the start of the section of code.

15. The article of manufacture of claim 13, wherein said initiating execution of the section of code comprises executing a first instruction corresponding to the first transactional mode, and wherein said initiating execution of the subsection of code comprises executing a second instruction corresponding to the second transactional mode, wherein the second instruction is different from the first instruction.

16. The article of manufacture of claim 13, wherein said executing the first instruction comprises recording a checkpoint at the start of the section of code.

17. The article of manufacture of claim 16, wherein the abort condition is caused by another one of the plurality of processors.

* * * * *